United States Patent [19]

Rzasa

[11] Patent Number: 5,227,226

[45] Date of Patent: Jul. 13, 1993

[54] TECHNICAL CLEANING CARD AND KIT

[76] Inventor: Richard B. Rzasa, 105 Tunxis St., Poquonock, Conn. 06064

[21] Appl. No.: 741,545

[22] Filed: Aug. 7, 1991

[51] Int. Cl.$^5$ .................. B08B 1/00; B32B 33/00
[52] U.S. Cl. ......................... 428/219; 15/210.1; 15/DIG. 12; 15/104.93; 206/205; 428/220; 428/288; 428/289
[58] Field of Search ............ 428/219, 220, 288, 289; 15/210.1, DIG. 12

[56] References Cited

U.S. PATENT DOCUMENTS

| | | | |
|---|---|---|---|
| 3,789,452 | 2/1974 | Nemoto | 15/210.1 |
| 4,104,436 | 8/1978 | Suzuki et al. | 15/210.1 |
| 4,933,015 | 6/1990 | White | 15/210.1 |
| 5,075,919 | 12/1991 | Rogers et al. | 15/210.1 |
| 5,153,964 | 10/1992 | Gelardi et al. | 15/210.1 |

*Primary Examiner*—James C. Cannon
*Attorney, Agent, or Firm*—Chilton, Alix & Van Kirk

[57] ABSTRACT

A discrete card or sheet of substantially homogeneous spun-bonded polyester material having a thickness in the range of 0.009-0.015 inch, and a length-to-width ratio in the range of 1.00-14.0, provides high absorption of cleaning solvent, including petroleum-based solvents, for cleaning rollers and read or print heads. A pouch, preferably made of barrier film and having two compartments, encapsulates a plurality of fresh cards with solvent in one compartment and at least one used card in the other compartment.

8 Claims, 2 Drawing Sheets

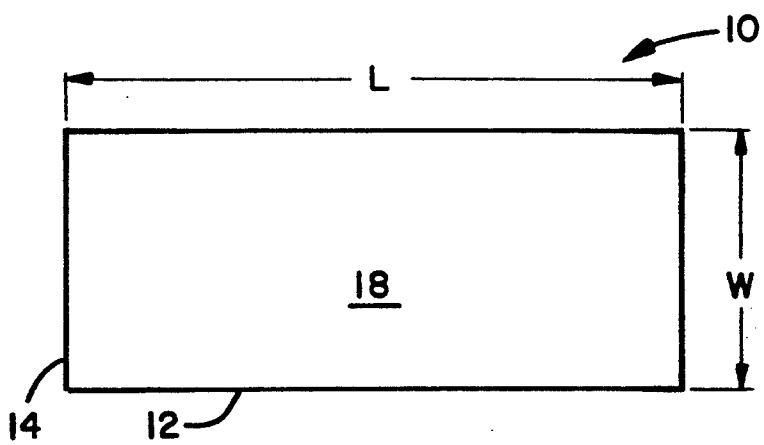
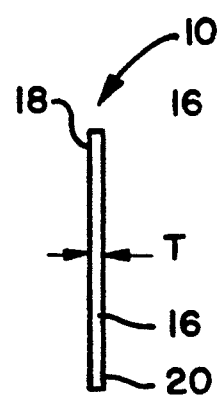
Fig. 1    Fig. 2
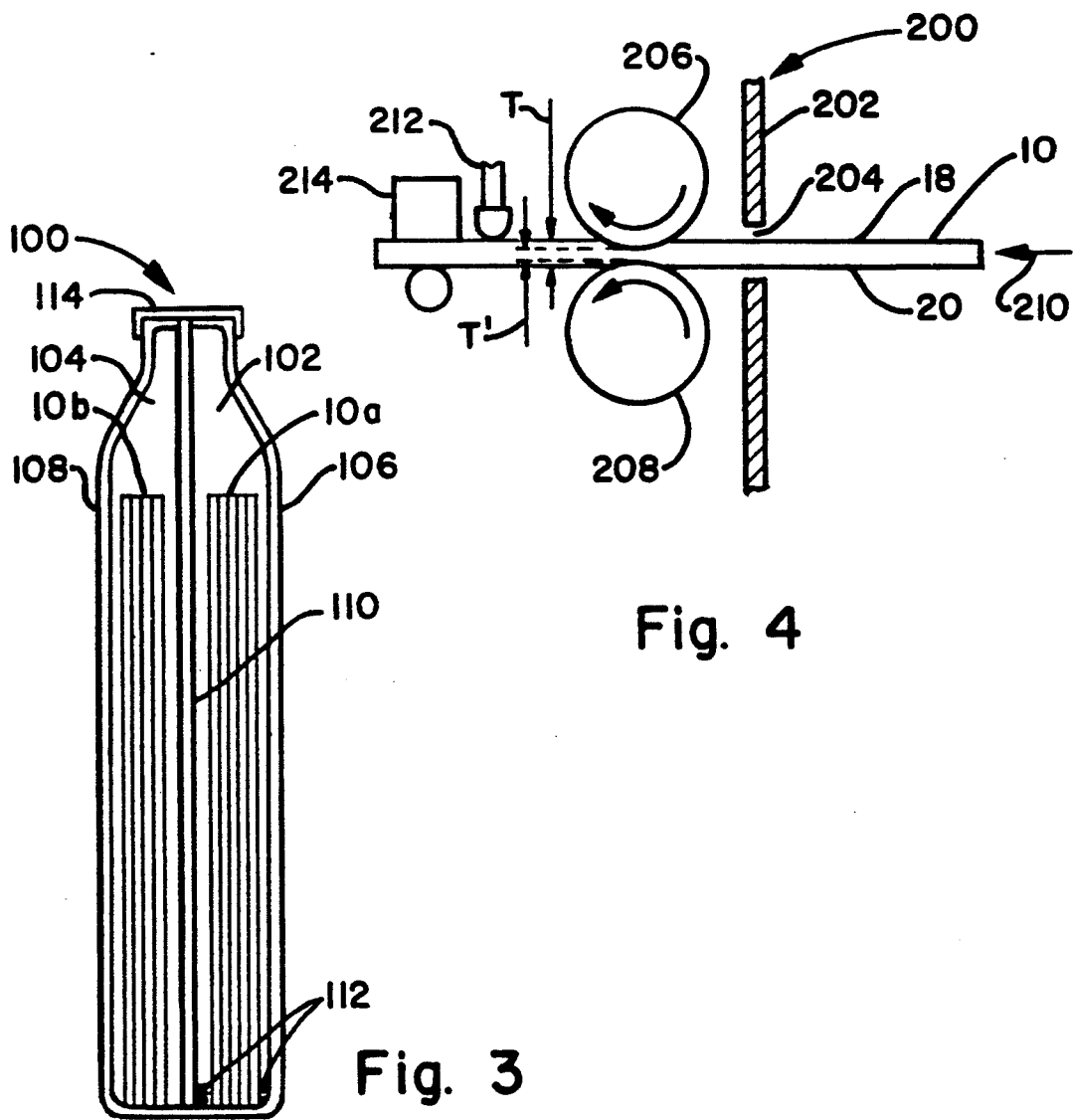
Fig. 4
Fig. 3

TECHNICAL CLEANING CARD AND KIT

BACKGROUND OF THE INVENTION

The present invention relates to so-called technical cleaning, and more particularly to the cleaning of paper feed path rollers and associated optical, thermal and magnetic read or print heads of the type generally used in data processing equipment.

Throughout vending, gaming, character recognition, ticketing, and similar industries, a paper substrate carrying information of one form or another is inserted through a slot in the processing equipment, where the paper is engaged by one or more feed rollers and thereby conveyed to the point of actual data or other processing, e.g., reading or printing. In other instances, the paper supply is stored within the equipment, and dispensed outwardly through a slot by feed rollers. The information carried on the paper substrate may take a variety of forms, and may be covered by a protective coating, but in any event, the friction between the feed rollers and the paper being conveyed, causes minute transfer of surface materials from the paper to the roller (or printing or reading heads). Over time, these contaminants accumulate on the rollers and produce three undesirable effects. First, the contaminants often change the coefficient of friction of the roller surfaces. Secondly, they may change the dimension of the gap through which the paper passes while engaging the roller. Thirdly, contaminants are transferred to print or read heads. For these reasons, the rollers must be cleaned periodically, on a schedule dependent on the extent of use of the equipment.

A common method for cleaning such feed rollers is to select a cleaning card having the approximate dimensions of the paper that is normally conveyed by the rollers, applying a solvent to the cleaning card, and passing the cleaning card through the rollers. Typically, the cards are constructed as a laminate consisting of a flat semirigid core of acrylic or PVC material, with nonwoven fibers bonded to the upper and lower side surfaces thereof. The nonwoven fibers provide some abrasive effect while passing through the rollers, and provide minute surface irregularities where the solvent can be distributed for transfer to the roller surface during engagement of the card with the rollers.

Due to the nonabsorbent nature of the core, and the relatively thin layer of nonwoven fiber, the solvent is not absorbed in the card, but rather is trapped only among the fibers at the surface. In most equipment, feed rollers are arranged in pairs, such that the paper, and the cleaning card, passes between opposed rotating surfaces of the roller pair. For this reason, it is desirable to carry solvent on both upper and lower surfaces of the cleaning card as it passes between the pair of rollers. Due to the non-absorbent characteristics of such conventional cleaning cards, the user must apply solvent first to one side of the card, then to the other side (or reverse the card), taking care to avoid or wipe up, drippings of excess solvent that run off the non-absorbing cleaning surfaces.

It is possible to purchase individually wrapped, prewetted cleaning cards, but this is rather costly because each card is individually sealed and wrapped. Whether the user starts with a "dry" card and applies the solvent from a bottle, or whether a "wet" card is taken from the pouch, the moistened card must be inserted immediately, because the highly volatile solvent, which is carried only on the surface, quickly evaporates.

SUMMARY OF THE INVENTION

It is, accordingly, an object of the present invention to provide a cleaning card that absorbs a wide range of cleaning solvents, while providing a surface texture that, in combination with the solvent, effectively cleans feed path rollers and optical, magnetic or thermal read/print heads.

It is a further object of the invention to provide a card cleaner which has the solvent absorbing and surface texture properties mentioned immediately above, and which is especially adapted for the cleaning of feed path rollers sized to accept standard OCR data entry cards or currency readers/counters.

It is yet a further object of the invention to provide a card cleaning pouch or kit by which a plurality of cards may be stored together in a "wet" condition, within a single pouch.

It is another object of the invention to provide a method by which feed path rollers or heads can be cleaned quickly and efficiently, while minimizing the release of solvent compounds into the ambient environment.

These and other objects and advantages of the invention are provided in one embodiment by forming the card as a discrete sheet of substantially homogeneous spun-bonded polyester material having a thickness in the range of about 0.009–0.015 inch, and a length-to-width ratio between about 1.00 and 14.0. The spun-bonded polyester material is preferably formed by randomly arranged, compacted, continuous filament polyester fibers, which are somewhat permeable to air, and thereby permit substantial absorption of solvent throughout the thickness of the sheet.

In another embodiment, the invention is directed to a cleaning pouch or kit having a plurality of discrete sheets of substantially homogeneous spun-bonded polyester material, encapsulated in a resealable pouch with sufficient cleaning solvent to thoroughly wet the entire volume of each of the sheets in the pouch. Preferably, the pouch includes two compartments, the first compartment being resealable for encapsulating all the sheets with the solvent, and a second compartment defining a receptacle for storing the sheets after use.

The method embodiment of the invention utilizes the pouch embodiment of the invention, whereby the first pouch is opened, a "wet" card removed therefrom, inserted through the feed rollers, removed from the equipment, and deposited in the second compartment, whereupon the pouch is resealed.

The present invention has numerous advantages relative to the techniques described in the background portion of the specification. First, the unitary, homogeneous sheet can be more easily manufactured than the laminate structure typical of the conventional card. The laminate structure necessarily includes binders, adhesives, and perhaps other materials which are necessary for the lamination process, but which, in the presence of the solvents required for cleaning the feed path rollers, will deteriorate and thus undermine the structural integrity of the card. For this reason, the conventional solvents are limited to isopropyl alcohol (IPA) and mild glass cleaner, perhaps including ammonia. More powerful and desirable solvents, such as acetones and oxidizers including 1-1-1-trichloroethylene, and methylethylene ketones (MEK), cannot be used with dry conventional cards, and cannot be stored with cards wet in the pouch. On the other hand, with the present invention, which is formed of essentially pure polyester fibers, none of these solvents will cause deterioration or degradation of the cards.

Another significant advantage relative to the conventional card described above, is the substantially increase in absorptive capacity. With a conventional card, on which the solvent is retained only on the surfaces, the solvent evaporates quickly, even from a wet card that has been sealed in its own pouch. Providing a substantial number of cards in a wet pouch is not cost-effective, because so much solvent evaporates each time the pouch is opened, that either the last cards to be used carry insufficient solvent, or a high cost must be borne for providing a substantial oversupply of solvent in the pouch, to account for the high evaporation losses. With the present invention, each of the plurality of cards within the pouch absorbs solvent substantially throughout its entire volume, which results in two significant advantages.

First, for a given card that has been removed from the pouch, the insertion of the card into the rollers can be made at a more leisurely pace. Moreover, the card retains sufficient wetting to permit a second insertion, without adding solvent. In the case of the use of a dry inventive card, the application of solvent can be made only on the top side, and the lower surface will be moistened as a result of absorption through the thickness of the card. The second significant advantage is that the total amount of solvent provided in the pouch need be only slightly greater than the amount that would be required if each of the cards were used as a "dry" card with solvent added manually. This is because most of the solvent in the pouch is retained in the interior volume of the cards, rather than on the surfaces, so that relatively little evaporation occurs when the pouch is opened to remove one card.

In the preferred embodiment of the pouch or kit, a second compartment is provided in the pouch, where used cards can be stored, and preferably sealed. In a typical situation, the used card is deposited in the nearest waste basket, where in a relatively short time, all of the solvent evaporates into the ambient environment. With the pouch including double compartment in accordance with the present invention, the used cards and the solvent carried therein, are isolated from the ambient environment.

BRIEF DESCRIPTION OF THE DRAWINGS

The preferred embodiment of the invention will be described below with reference to the accompanying drawings where like numerals represent like structures, and where:

FIG. 1 is a plan view of the cleaning card of the present invention;

FIG. 2 is a end view of the card of FIG. 1, showing the thickness thereof;

FIG. 3 is an elevation section view of a pouch containing a plurality of cards of the type shown in FIG. 1, in accordance with a kit embodiment of the invention;

FIG. 4 is a schematic representation of the method of using the card to clean feed rollers in a paper processing device;

DESCRIPTION OF THE PREFERRED EMBODIMENT

Figure 5:
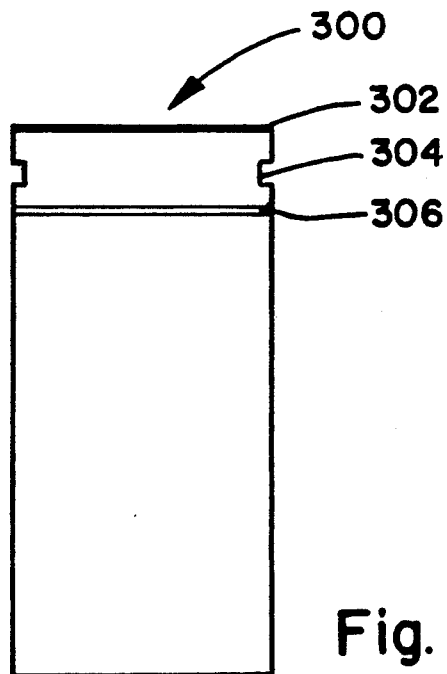
FIG. 5 is a schematic front elevation section view, of a single compartment pouch for a plurality of cards.

FIGS. 1 and 2 show a generally rectangular card 10 in accordance with one embodiment of the present invention, especially adapted to clean feed path rollers of the type associated with a paper processing device 200 shown in FIG. 4. The card as shown has a opposed longitudinal edges 12 of length L, opposed transverse edges 14 of width W a height 16, of thickness T. The dimensions L and W define an upper side 18 and a lower side 20, having textured surfaces which contact and produce a cleaning action on, the respective roller surfaces 206,208 as shown in FIG. 4.

The card 10 in one embodiment of the invention consists substantially entirely, of a discrete sheet of substantially homogeneous spun-bonded polyester material which has textured side surfaces 18,20, and a permeability that facilitates absorption of cleaning solvent, without degradation or chemical reaction with the card material. The material is formed from continuous filament polyester fibers that have been compacted by heat, pressure and tension, to produce a randomly arranged continuous filament structure that produces high tensile and tear strength and controlled permeability. The chemical properties are essentially those of polyester fiber.

The preferred material is commercially available under the trademark "HOLLYTEX" from Eaton-Dikeman, a division of Knowlton Bros., a subsidiary of Filtration Sciences, Inc. The HOLLYTEX material is 100% polyester, with no resins, sizings or binders, and is chemically resistant to acids, oxidizing agents, and solvents.

Preferably, the card thickness T as shown in FIG. 2, is slightly greater than the nominal thickness of the paper that the feed rollers are designed to accept during routine operation. The standard thickness for optical character recognition (OCR) data entry card, bar code-/ATB label printer and reader equipment, and many other devices of interest, is 0.0095 inch. The HOLLYTEX material identified as Style 3283, having a nominal thickness of 0.011 inch, is ideally suited as a card material for cleaning rollers for this size paper. The following table shows the range, and preferred values, of various properties of the preferred spun-bonded polyester material of the present invention:

| Property | Minimum | Preferred | Maximum |
| --- | --- | --- | --- |
| Thickness | 0.009 | 0.011 | 0.015 |
| Nominal Basis Wt. (oz./yd$^2$) | 3.5 | 4.3 | 4.5 |
| Air Permeability (CFM/ft$^2$) | 30 | 40 | 50 |
| MD Tensile Strength (lbs.) | 40 | 60 | 80 |
| XD Tensile Strength (lbs.) | 20 | 37 | 45 |

The most important properties for effectiveness as a cleaning card according to the present invention, are believed to include the permeability, especially in the range of 30–50 CFM/ft.sq, and the relatively high rigidity for what appears at first glance to a fibrous, paper-like sheet. The texture and overall "feel" is somewhat like that of high-quality bond paper.

The preferred shape of the card in plan view is generally rectangular, with the aspect ratio (L/W), falling in the range of between about 1.00 and 14.0. The invention is especially well adapted for cleaning dollar bill acceptors, bill changers, currency counters and the like, where the aspect ratio is about 2.5, i.e., 6 inches by 2.5 inches. In general, the aspect ratio in the most useful embodiments would fall within the range of about 1.50 to 8.0. This aspect ratio would cover paper processing devices adapted to convey currency, checks, lottery, gaming, and other ticket dispensers, OCR readers ATB printers, thermal print heads, magnetic head readers and the like (hereinafter, "rollers and heads").

Although the cards in accordance with the present invention can be furnished in a "dry" condition, adapted to absorb solvent immediately before insertion into the feed path rollers, the preferred manner of packaging of the cards is shown in FIG. 3. A pouch 100, preferably made from a plastic barrier film, is divided into first and second compartments, 102,104. The first compartment is substantially defined by a first outer wall 106 and an internal dividing wall 110, and the second compartment is defined by the other outer wall 108 and the internal compartment 110. The first compartment 102 encapsulates a plurality of cards 10a, along with a quantity of solvent, most of which is absorbed within the cards, but some of which may be in free liquid form as shown at 112. The second compartment 104 is adapted to receive used cards 10b. Compartments 102 and 104 may be clearly distinguished by markings on the exterior walls 106,108, respectively.

In the embodiment shown in FIG. 3, a closure or seal member 114 of any convenient construction, permits the opening and closing of both compartments 102,104 simultaneously. An equivalent construction would provide a different resealable closure for each of the compartments 102,104. In this embodiment of the invention, the compartment 102 which contains the unused cards 10a and solvent 112, must be resealably closed; the seal for the second compartment 104 is optional, but desirable.

Although the double compartment pouch shown in FIG. 3 can be used with cards other than those described with respect to FIG. 1, the preferred embodiment utilizes the substantially homogeneous spunbonded polyester material because as noted above it is far more absorbent than conventional cards, and it is far more resistant to deterioration from a wide variety of cleaning agents, including acids, oxidizing agents, and petroleum-based solvents. Of course, the pouch material must be similarly resistant to attack by the solvents. The preferred barrier film material for the packaging is available as LF3101 from LF&T, Inc., Portsmouth, N.H. The material is a laminate of, for example, 48 gauge PET (available from DuPont, ICI, or 3-M), adhesively bonded to an LDPE film EVA co-polymer, for example, 0.002 inch, as available from Consolidated or Deerfield. The laminate is the same as that from which the Scotch Pack 48, a tamper-evident zipper pouch for medical use, is made and sold by LF&T, Inc.

Thus, the combination of one card saturated with a petroleum-based or other aggressive solvent within a barrier film pouch, provides a significant advantage relative to the prior art. Similarly, a pouch having two compartments for holding a plurality of cards, regardless of the card material, is also a novel aspect of the present invention. In a very effective utilization of the present invention, a pouch made of barrier film encapsulates a plurality of inventive cards with a petroleum-based or other aggressive solvent. In the most advantageous embodiment, such a pouch has a second compartment, for sealingly retaining one or more cards that have been used. In some instances, a used card that has been sealed in the second compartment, retains sufficient solvent to be used for cleaning a second or third time.

In the preferred method embodiment of the invention, a plurality of cards, preferably four to ten cards, are loosely contained within compartment 102 of pouch 100 along with a supply of cleaning solution or solvent. The second compartment 104 is empty. The relatively loose packing of the cards 10a in compartment 102 assures that the solvent will be absorbed substantially uniformly throughout the volume of each card. With reference now to FIG. 4, a paper processing device 200, such as a bill acceptor, OCR, or ATB device, is shown with a housing 202 having a slot 204 through which a cleaning card 10 will be inserted for engagement by the feed path rollers 206,208, thereby to be conveyed at least initially in the direction shown by arrow 210. An optic reader head 212 and a magnetic reader head 214 are also shown schematically. As an example, the cleaning of the roller 206,208 will be described.

To clean the rollers 206,208, the user opens the pouch 100 shown in FIG. 3, removes one of the cards from the plurality 10A in first compartment 102, and inserts the card through slot 204 into engagement with rollers 206,208. The thickness T of the cleaning card 10 is preferably slightly greater than the nominal gap T' defined by the minimum distance between the roller surfaces. For a roller pair 206,208 design to accept, for example, OCR cards having a thickness of 0.0095 inch, the cleaning card thickness should ideally be in the range of about 0.010–0.012 inch. This assures that substantial friction and thus an abrasive action, will be produced between the card and the roller surfaces, and that the solvent that is present below the surface of the card, will be "squeezed" out against the rollers to enhance the cleaning action.

After the used cleaning card 10 has been discharge from slot 204 or a separate discharge slot in accordance with the particular design of the device 200, the user simply deposits the used card into the second compartment 104 of pouch 100. This procedure is followed each time the rollers require cleaning, until, eventually, all of the cards that were originally in compartment 102 have been deposited in compartment 104, whereupon the entire pouch 100 can be thrown away. Optionally, only the most recently used card is stored in compartment 104, and reused until the solvent has evaporated or the surface has become excessively contaminated. The used card is then discarded and a new card from compartment 102 is used for the next cleaning.

FIG. 5 shows one construction of a barrier film pouch 300 for encapsulating a plurality, preferably ten, cleaning cards. The pouch prior to loading of the cards, is sealed at the top as shown at 302, and a tear notch 304 is provided immediately below the seal 302. Immediately below the tear notch, a zipper 306 traverses the width of the pouch for joining the front and back walls. Initially, the lower end 308 of the pouch is open for insertion of the cards and the solvent, whereupon the lower edge is heat sealed. For a card that is, for example, 8.0 inches long, the overall length dimension of the pouch is about 9.0 inches and the distance from the zipper 306 to the lower edge 308 is about 8.25 inches. Immediately prior to use, the heat seal 302 is torn off at 304.

Figures 6, 7:
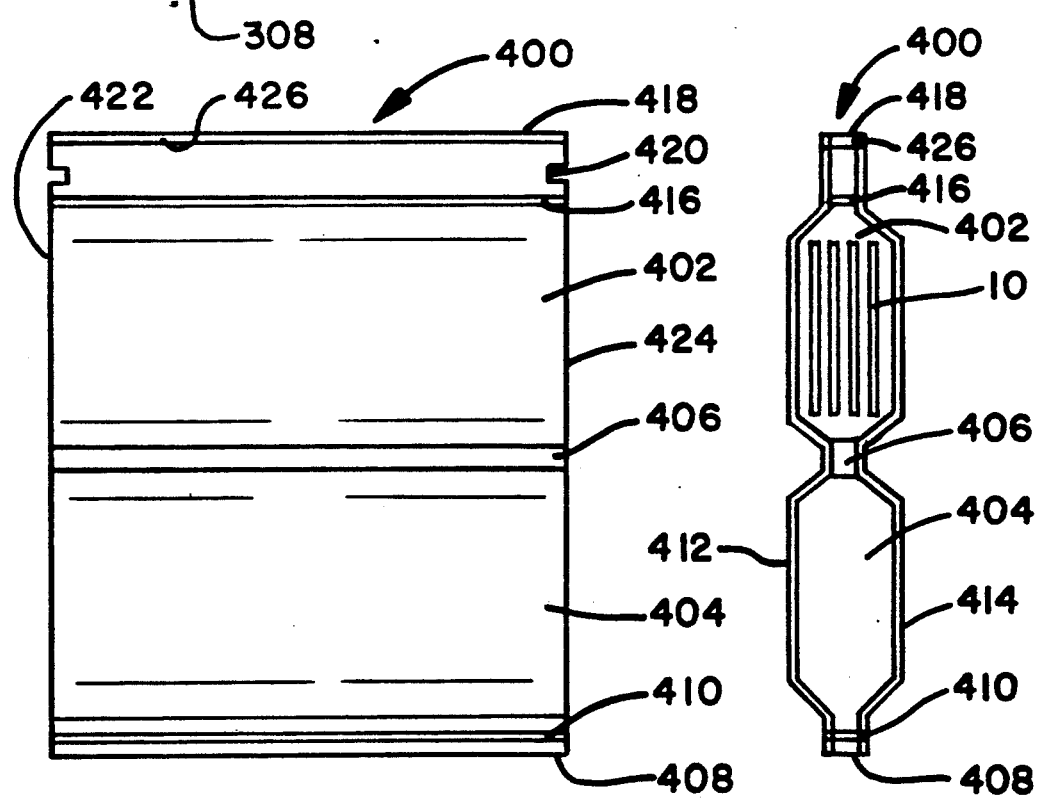
FIG. 6 is a schematic front elevation view of another embodiment of the inventive pouch.
FIG. 7 is a side section view of the pouch shown in FIG. 6.

FIGS. 6 and 7 show a variation of the two-compartment pouch such as described with respect to FIG. 3 above. In this embodiment 400, the first, or main storage compartment 402 is immediately above the secondary storage compartment 404. In overall construction, the embodiment of FIGS. 6 and 7 can be thought of as a single bag made from barrier film, which has been heat sealed 406 in the transverse direction substantially at the vertical center, so as to provide two isolated compartments 402,404. At the pouch lower edge 408 remote from the central seal 406, a resealable zipper 410 is provided to join the front and back walls 412,414. A similar resealable zipper is provided for the upper compartment, substantially symmetrically relative to the central seal. The zipper 416 for the first compartment 402 is not, however, at the transverse upper edge 418 of the pouch during the fabrication, shipment, and storage of the pouch prior to use. Rather, as in the embodiment shown in FIG. 5, the pouch initially extends above the zipper 416, where a tear notch 420 is formed and where the upper edge 418 of the pouch is initially open, but adapted for heat sealing. After the side edges 422,424 of the pouch have been heat sealed together, and the transverse heat seal 406 formed but while the upper zipper is open, the plurality of cards are inserted through the open upper end into the upper compartment 402. The cleaning solvent, preferably petroleum-based, is also deposited therein. Then the upper zipper 416 is closed and the upper edge 418 is heat sealed 426 above the tear notch. The heat seal 426 provides an added measure of safety to the compartment 402 during shipment and storage, in the event upper zipper 416 loosens. After the heat seal is torn away, only zipper 416 seals the upper end of compartment 402.

What is claimed is:

1. A technical cleaning card for cleaning feed path rollers read/print heads and the like, comprising a discrete sheet of substantially homogeneous spunbonded polyester material having length (L), width (W), and thickness (T) dimensions defining opposed side surfaces for contacting said rollers, said dimensions falling within the range of about, $$0.009 \text{ inch} < T < 0.015 \text{ inch}$$

$$1.00 < L/W < 14.0$$

2. The card of claim 1, wherein the material is formed by randomly arranged, compacted, continuous filament polyester fibers.

3. The card of claim 1, wherein the material has an air permeability of between about 30 and 50 $CFM/Ft^2$.

4. The card of claim 1, wherein said dimensions fall within the ranges of about, $$0.010 \text{ inch} < T < 0.012 \text{ inch}$$

$$1.50 < L/W < 8.0$$

5. The card of claim 1, wherein the material is physically equivalent to the Hollytex brand of polyester material.

6. The card of claim 5, wherein the material has a thickness of about 0.011 inch, a basis weight of about 4.3 oz./$yd^2$, an air permeability of about 40 $CFM/Ft^2$, and a tensile strength of about 60 lbs.MD and 37 lbs.XD.

7. A technical cleaning card for cleaning feed path rollers and the like, consisting of:
a discrete sheet of substantially homogeneous spunbonded polyester material having a thickness in the range of about 0.009 to 0.015 inch and length and width dimensions that are in a ratio of length-to-width between about 1.00 and 14.0;
cleaning solvent absorbed substantially throughout the thickness of the sheet.

8. The card of claim 7, wherein the cleaning solvent is petroleum-based.

* * * * *